(12) United States Patent
Price (10) Patent No.: US 7,580,910 B2
(45) Date of Patent: Aug. 25, 2009

(54) PERTURBING LATENT SEMANTIC INDEXING SPACES

(75) Inventor: Robert Jenson Price, Ashburn, VA (US)

(73) Assignee: Content Analyst Company, LLC, Reston, VA (US)

( * ) Notice: Subject to any disclaimer, the term of this patent is extended or adjusted under 35 U.S.C. 154(b) by 431 days.

(21) Appl. No.: 11/393,883

(22) Filed: Mar. 31, 2006

(65) Prior Publication Data

US 2006/0235661 A1  Oct. 19, 2006

Related U.S. Application Data

(60) Provisional application No. 60/668,573, filed on Apr. 6, 2005.

(51) Int. Cl.
*G06N 5/00* (2006.01)
(52) U.S. Cl. .................. 706/46; 706/45; 178/18.04
(58) Field of Classification Search ............. 178/18.04; 382/100; 706/45, 46
See application file for complete search history.

(56) References Cited

U.S. PATENT DOCUMENTS

| | | | |
|---|---|---|---|
| 4,839,853 A | | 6/1989 | Deerwester et al. |
| 5,301,109 A | | 4/1994 | Landauer et al. |
| 5,854,450 A | * | 12/1998 | Kent .................. 178/18.04 |
| 5,986,224 A | * | 11/1999 | Kent .................. 178/18.04 |
| 6,332,030 B1 | * | 12/2001 | Manjunath et al. .......... 382/100 |
| 6,615,208 B1 | | 9/2003 | Behrens et al. |

OTHER PUBLICATIONS

Deerwester, S., et al., "Indexing by Latent Semantic Analysis," Journal of the American Society for Information Science, 41(6), pp. 391-407, Oct. 1990.
Ding, C., A Similarity-based Probability Model for Latent Semantic Indexing, Proceedings of the 22nd Annual SIGIR Conference, Berkeley, Calif., Aug. 1999.
William H. Press et al., "Numerical Recipes," The Art of Scientific Computing, Chapter 2, pp. 52-64, Cambridge University Press, 1986.
Teuvo Kohonen, "Self-Organizing Maps," Third Edition, Springer-Verlag Berlin Heidelberg, New York, pp. 105-115 and 191-194.
T. Hoffman, "Probabilistic Latent Semantic Indexing," Proceedings of the 22nd Annual SIGIR Conference, Berkley, CA, 1999, pp. 50-57.

(Continued)

*Primary Examiner*—Wilbert L Starks, Jr.
(74) *Attorney, Agent, or Firm*—Sterne, Kessler, Goldstein & Fox PLLC (57) ABSTRACT

A text processing method is provided that includes the following steps. First, an abstract mathematical vector space is generated based on a collection of documents. Respective documents in the collection of documents have a representation in the abstract mathematical vector space and respective terms contained in the collection of documents have a representation in the abstract mathematical vector space. Then, the abstract mathematical vector space is perturbed to produce a perturbed abstract mathematical vector space that is stored in an electronic format accessible to a user. Perturbing the abstract mathematical vector space may include modifying the representation of a document with a newly computed representation for that document, or modifying the representation of a term with a newly computed representation for that term.

25 Claims, 4 Drawing Sheets

OTHER PUBLICATIONS

G. Marchisio and J. Liang, "Experiments in Trilingual Cross-language Information Retrieval," Proceedings, 2001 Symposium on Document Image Understanding Technology, Columbia, MD, 2001, pp. 169-178.

T. Kolda and D. O'Leary, "A Semidiscrete Matrix Decomposition for Latent Semantic Indexing Information Retrieval," 16 ACM Transactions on Information Systems 322-46 (Oct. 1998).

* cited by examiner

PERTURBING LATENT SEMANTIC INDEXING SPACES

CROSS REFERENCE TO RELATED APPLICATIONS

This application claims benefit under 35 U.S.C. § 119(e) to U.S. Provisional Patent Application 60/668,573, entitled "Perturbing Latent Semantic Indexing Spaces to Incorporate The Influence of Additional Documents," to Price, filed on Apr. 6, 2005, the entirety of which is hereby incorporated by reference as if fully set forth herein.

BACKGROUND

1. Field of the Invention

The present invention relates generally to information processing and data retrieval, and in particular to text processing.

2. Background

Data retrieval is of utmost importance in the current Age of Information. Presently, there are myriads of documents available in electronic form, accessible via the Internet, and stored in such places as proprietary databases, microcomputer hard drives, hand-held devices, etc. In the future, the number of electronic documents available, and the rate at which these documents are produced, will only increase. Amid this vast sea of information, a user must be able to locate and retrieve documents of interest.

One well-known approach for locating and retrieving documents of interest is a keyword search. In a keyword search, a document is located and retrieved if the word(s) of a user's query explicitly appear in the document. However, there are at least two problems with this approach. First, a keyword search will not retrieve a document that is conceptually relevant to the user's query if the document does not contain the exact word(s) of the query. Second, a keyword search may retrieve a document that is not conceptually relevant to the intended meaning of a user's query. This may occur because words often have multiple meanings or senses. For example, the word "tank" has a meaning associated with "a military vehicle" and a meaning associated with "a container."

A technique called Latent Semantic Indexing (LSI) offers a superior alternative to simple keyword searching. LSI is described, for example, in commonly-owned U.S. Pat. No. 4,839,853 to Deerwester et al., the entirety of which is incorporated by reference herein. According to LSI, a mathematical vector space, called an LSI space, is used to represent a collection of documents and terms contained in that collection of documents. In the LSI technique, a document is determined to be conceptually relevant to a user's query based on the proximity between the document and the user's query, wherein proximity is measured in the LSI space. The performance of LSI-based document retrieval far exceeds that of keyword searching because documents that are conceptually similar to the query are retrieved even when the user's query and the retrieved documents use different terms to describe similar concepts.

An LSI space is created from a collection of documents. Each document in the collection, and each unique term contained in the documents, has a vector representation in the LSI space. According to current LSI techniques, however, the LSI space is typically recreated each time the influence of additional documents and/or terms is to be included. That is, a new LSI space is created based on the original collection of documents and the additional documents and/or terms. Given the current rate at which documents are created, and that this rate will likely increase in the future, this method for incorporating the influence of additional documents and/or terms is problematic because creating an LSI space is a computationally expensive and time consuming process.

Therefore, what is needed is a method and computer program product for perturbing an abstract mathematical vector space that represents a collection of documents (e.g., an LSI space) to incorporate the influence of additional documents and/or terms. Such a method and computer program product should not require that the abstract mathematical vector space be recreated each time the influence of additional documents and/or terms is to be included. In addition, such a method and computer program product should allow the influence of documents and/or terms to be removed from the abstract mathematical vector space without requiring that the abstract mathematical vector space be recreated.

SUMMARY OF THE INVENTION

Embodiments of the present invention provide a method and computer program product for perturbing an abstract mathematical vector space that represents a collection of documents (e.g., an LSI space) to incorporate the influence of additional documents and/or terms. This method and computer program product does not require that the abstract mathematical vector space be recreated each time the influence of additional documents and/or terms is to be included. In addition, this method and computer program product allows the influence of documents and/or terms to be removed from the abstract mathematical vector space without requiring that the abstract mathematical vector space be recreated.

According to an embodiment of the present invention, there is provided a text processing method that includes the following steps. First, an abstract mathematical vector space is generated based on a collection of documents. Respective documents in the collection of documents have a representation in the abstract mathematical vector space and respective terms contained in the collection of documents have a representation in the abstract mathematical vector space. Then, the abstract mathematical vector space is perturbed to produce a perturbed abstract mathematical vector space that is stored in an electronic format accessible to a user. Perturbing the abstract mathematical vector space may include modifying the representation of a document with a newly computed representation for that document, or modifying the representation of a term with a newly computed representation for that term.

According to another embodiment of the present invention, there is provided a text processing method that includes the following steps. First, a first abstract mathematical vector space and a second abstract mathematical vector space are provided. The first abstract mathematical vector space is based on a first collection of documents and the second abstract mathematical vector space is based on a second collection of documents. Then, the first abstract mathematical vector space is merged with the second abstract mathematical vector space to produce a merged abstract mathematical vector space that is stored in an electronic format accessible to a user. The merging is based on a vector averaging of vectors in the first abstract mathematical vector space with vectors in the second abstract mathematical vector space.

According to a further embodiment of the present invention, there is provided a computer program product including a computer usable medium having control logic stored therein for processing text. The control logic includes computer readable first and second program code. The computer readable first program code causes the computer to generate an abstract mathematical vector space based on a collection of documents, wherein respective documents in the collection of documents have a representation in the abstract mathematical vector space and respective terms contained in the collection of documents have a representation in the abstract mathematical vector space. The computer readable second program code causes the computer to perturb the abstract mathematical vector space to produce a perturbed abstract mathematical vector space that is stored in an electronic format accessible to a user. Perturbing the abstract mathematical vector space includes at least one of (i) modifying the representation of a document with a newly computed representation for that document, or (ii) modifying the representation of a term with a newly computed representation for that term.

According to a still further embodiment of the present invention, there is provided a computer program product including a computer usable medium having control logic stored therein for processing text. The control logic includes computer readable first and second program code. The computer readable first program code causes the computer to provide a first abstract mathematical vector space and a second abstract mathematical vector space, wherein the first abstract mathematical vector space is based on a first collection of documents and the second abstract mathematical vector space is based on a second collection of documents. The computer readable second program code causes the computer to merge the first abstract mathematical vector space with the second abstract mathematical vector space to produce a merged abstract mathematical vector space that is stored in an electronic format accessible to a user, wherein merging is based on a vector averaging of vectors in the first abstract mathematical vector space with vectors in the second abstract mathematical vector space.

Embodiments of the present invention can be used to perturb an LSI space created with publicly available texts to allow the influence of a handful of sensitive documents to more strongly expose the concepts of the sensitive documents within the collection of public texts. In addition, embodiments of the present invention allow the merging of such perturbations from multiple sensitive sources into a single morphed LSI space, thereby including the characteristics from all sources without directly exposing any of the sensitive documents. Furthermore, embodiments of the present invention can be used to build an LSI space with a partial set of documents and then enlarge the LSI space to accommodate the influence of a much larger set of documents beyond traditional LSI operations.

A method in accordance with an embodiment of the present invention has several advantages and provides some unique capabilities. For example, a method in accordance with an embodiment of the present invention allows the influence of a small or large additional set of documents to be incorporated into an existing abstract mathematical vector space (e.g., an LSI space) without re-creating the abstract mathematical vector space (e.g., without recomputing the expensive singular value decomposition (SVD) of a LSI space). As another example, a method in accordance with an embodiment of the present invention provides a technique for third parties to include perturbed spaces influenced by sensitive documents without releasing any sensitive content. As a further example, a method in accordance with an embodiment of the present invention allows multiple perturbed spaces to be effectively merged, since their basis is a common initial abstract mathematical vector space (e.g., LSI space). As a still further example, a method in accordance with an embodiment of the present invention opens many possibilities for augmenting and enhancing an abstract mathematical vector space (e.g., LSI space) to suit specialized utilization requirements.

Further embodiments and features of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

I. Introduction

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As is described in more detail herein, embodiments of the present invention provide a method and computer program product for perturbing an abstract mathematical vector space that represents a collection of documents to incorporate the influence of additional documents and/or terms without requiring the computation of an entirely new abstract mathematical vector space. Additionally or alternatively, an embodiment of the present invention provides a method to merge two or more abstract mathematical vector spaces to incorporate the influences of the documents and/or terms represented in the two or more abstract mathematical vector spaces. First, an overview of a method for perturbing an abstract mathematical vector space is presented. Second, the LSI technique is described in more detail. Third, techniques for perturbing LSI spaces in accordance with embodiments of the present invention are described in more detail. Fourth, example sequences of perturbations are described. Fifth, an example computer system is described that may be used to implement embodiments of the present invention. Finally, example applications of the present invention are presented.

II. Overview

Figure 1:
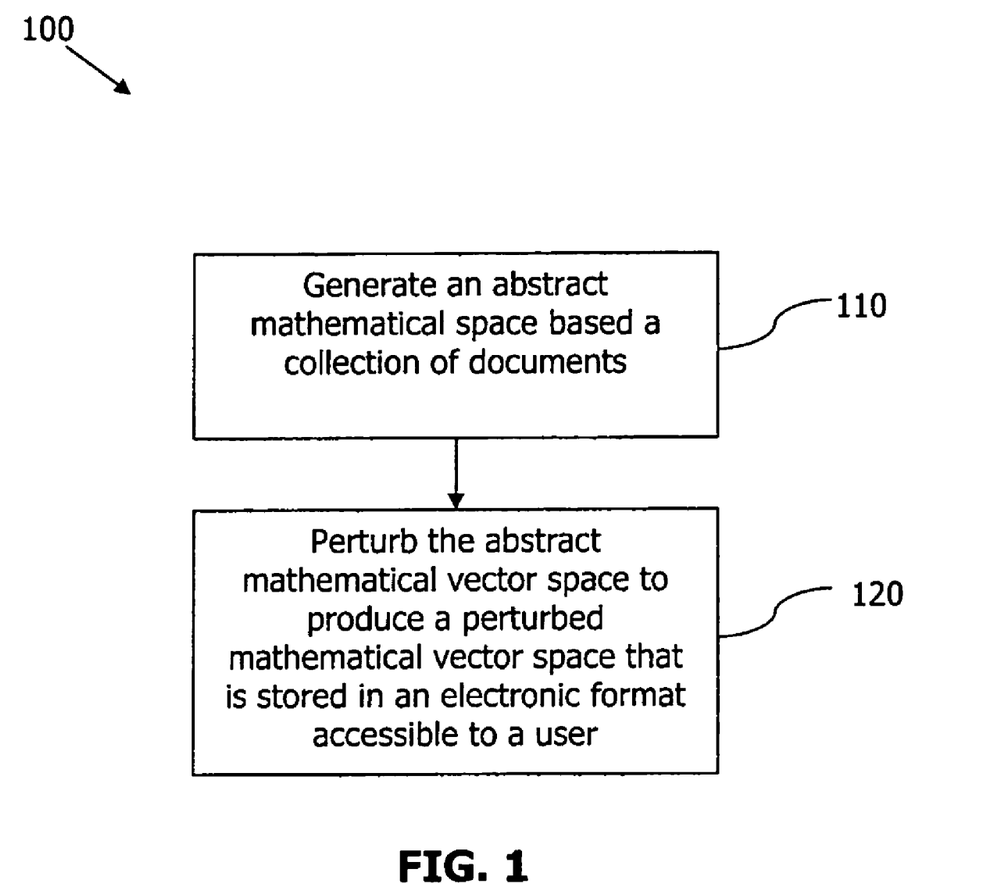
FIG. 1 is a flowchart illustrating an example method for processing text in accordance with an embodiment of the present invention.

FIG. 1 illustrates a flowchart 100 of an example method for perturbing an abstract mathematical vector space that represents terms and documents from a collection of documents (e.g., LSI space). By perturbing the abstract mathematical vector space, the influence of additional documents and/or terms can be incorporated in the space. Flowchart 100 begins at a step 110, in which an abstract mathematical vector space is generated based on a collection of documents. Generating the abstract mathematical vector space may include pre-processing all the text in the documents. Techniques for pre-processing document text are well-known by persons skilled in the relevant art(s). For example, a pre-processing technique can include, but is not limited to, identifying all words between punctuation marks or parenthetical remarks. The above-mentioned U.S. Pat. No. 4,839,853 describes methods for pre-processing text.

Respective documents in the collection of documents and respective terms have a representation in the abstract mathematical vector space. In an example in which the abstract mathematical vector space is an LSI space, the documents and terms are represented as vectors in the LSI space. After reading the description contained herein, it will become apparent to a person skilled in the relevant art how to implement embodiments of the present invention in an LSI space or other abstract mathematical vector spaces as are known in the relevant art(s).

In a step 120, the abstract mathematical vector space is perturbed to create a perturbed abstract mathematical vector space that is stored in an electronic format accessible to a user. In this way, additional information contained in documents or terms can be included in or removed from the abstract mathematical vector space without re-generating the abstract mathematical vector space. Perturbing the abstract mathematical vector space may be realized in a variety of ways. As described in more detail below, perturbing the abstract mathematical vector space may include, but is not limited to: (i) representing a new document in the abstract mathematical vector space; (ii) replacing the representation of an existing document with a newly calculated representation for that document; (iii) performing both items (i) and (ii); (iv) representing a new term in the abstract mathematical vector space; (v) replacing the representation of an existing term with a newly calculated representation for that term; (vi) performing both items (iv) and (v); (vii) deleting some or all document data from the abstract mathematical vector space; (viii) deleting some or all term data from the abstract mathematical vector space; (ix) merging two or more abstract mathematical vector spaces into a new space; and (x) other perturbing operations as would be apparent to a person skilled in the relevant art(s).

Figure 2:
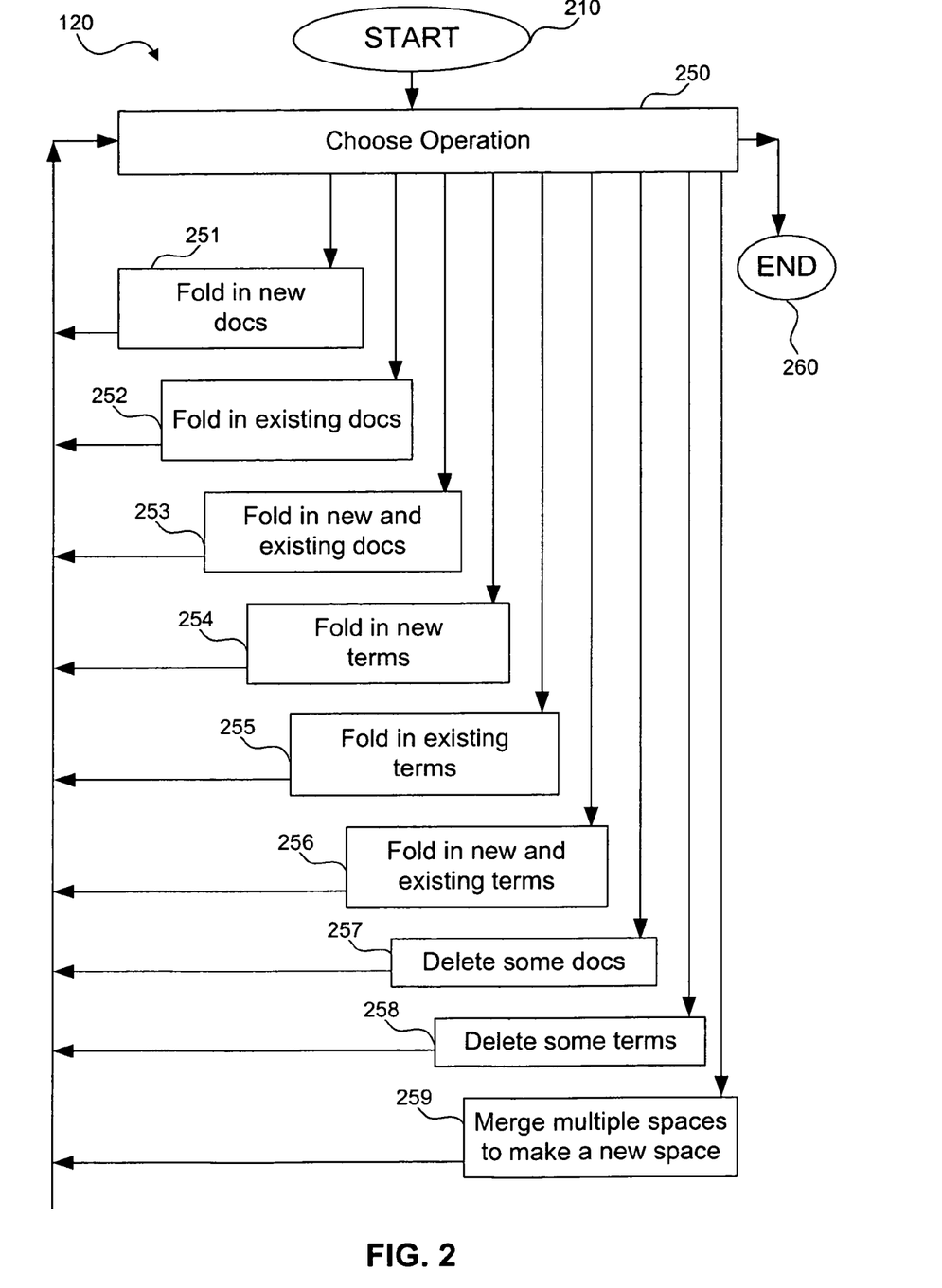
FIG. 2 is a flowchart illustrating a method for implementing the last step shown in the flowchart of FIG. 1.

FIG. 2 is a flowchart illustrating a method for implementing step 120 of FIG. 1. In particular, the flowchart depicted in FIG. 2 offers a conceptual overview of a method for perturbing an LSI space. The LSI technique is described in more detail in Section III. Methods of perturbing an LSI space are described in more detail in Section IV.

The method illustrated in FIG. 2 begins at a step 210 and immediately proceeds to a step 250 in which an operation for perturbing the LSI space is chosen. In a step 251, a new document is "folded in" the LSI space. Folding in a new document allows that document to be represented in the LSI space without the need for re-creating the LSI space—e.g., without the need for performing a step similar to step 110 of FIG. 1. Folding a document into an LSI space is described in more detail below in Section IV.A.

In a step 252, a document, which exists in the LSI space, is removed and then folded into the LSI space. In this way, the document will have a new location in the LSI space based on the folding in process. As illustrated in a step 253, both existing documents and new documents can be folded into the LSI space. Examples are presented in Section V illustrating situations in which folding a document into the LSI space may be useful.

In a step 254, a new term is "folded in" the LSI space. Folding in a new term allows that term to be represented in the LSI space without the need for re-creating the LSI space. Folding a term into an LSI space is described in more detail below in Section IV.B.

In a step 255, a term that exists in the LSI space is removed and then folded into the LSI space. In this way, the term will have a new location in the LSI space based on the folding in process. Similar to documents, both existing terms and new terms can be folded into the LSI space as illustrated by a step 256.

In a step 257, one or more documents are removed from the LSI space. Removing a document from the LSI space will not change the vector location of the other documents in the LSI space. Examples are presented in Section V illustrating situations in which removing a document from the LSI space may be useful.

In a step 258, one or more terms are removed from the LSI space. Removing a term from the LSI space will not change the vector location of the other terms in the LSI space. Examples are presented in Section V illustrating situations in which removing a term from the LSI space may be useful.

In a step 259, two or more LSI spaces are merged into a new space. Merging LSI spaces may involve merging all or only part of each LSI space. For example, the term spaces of a first and second LSI space can be merged without merging the documents spaces of these LSI spaces. Other variations are also possible as would be apparent to a person skilled in the relevant art(s) from reading the description contained herein.

After each of steps 251 through 259 the method returns to step 250. In this way, the various steps can be performed repeatedly and in any order. If it is determined in step 250 that no more perturbing operations are to be performed, the method ends at a step 260.

As mentioned above and described in the next section, in an embodiment, the abstract mathematical vector space generated in step 110 is an LSI space. However, as will be apparent to a person skilled in the relevant art(s) from the description contained herein, abstract mathematical vector spaces other than LSI spaces can be perturbed in the manners described herein without deviating from the scope and spirit of the present invention. For example, it will be apparent to a person skilled in the relevant art(s) that perturbations performed in accordance with embodiments of the present invention may be useful for any abstract mathematical vector space (i) that represents content included in a collection of documents, and (ii) that supports the notion of updates to the space by incrementally including new data.

Examples of other types of abstract mathematical vector spaces that may benefit from perturbing techniques in accordance with embodiments of the present invention can include, but are not limited to, the following: (i) probabilistic LSI (see, e.g., Hoffman, T., "Probabilistic Latent Semantic Indexing," *Proceedings of the 22$^{nd}$ Annual SIGIR Conference*, Berkeley, Calif., 1999, pp. 50-57); (ii) latent regression analysis (see, e.g., Marchisio, G., and Liang, J., "Experiments in Trilingual Cross-language Information Retrieval," *Proceedings, 2001 Symposium on Document Image Understanding Technology,* Columbia, Md., 2001, pp. 169-178); (iii) LSI using semi-discrete decomposition (see, e.g., Kolda, T., and O. Leary, D., "A Semidiscrete Matrix Decomposition for Latent Semantic Indexing Information Retrieval," *ACM Transactions on Information Systems,* Volume 16, Issue 4 (October 1998), pp. 322-346); and (iv) self-organizing maps (see, e.g., Kohonen, T., "Self-Organizing Maps," $3^{rd}$ Edition, Springer-Verlag, Berlin, 2001). Each of the foregoing cited references is incorporated by reference in its entirety herein.

III. Latent Semantic Indexing (LSI)

Before discussing details of embodiments of the present invention, it is helpful to present a motivating example of LSI, which can also be found in the '853 patent mentioned above. This motivating example is used to explain the generation of an LSI space and the reduction of that space using a technique called Singular Value Decomposition (SVD). From this motivating example, a general overview of the mathematical structure of the LSI model is given, including a mathematical description of how to compute the conceptual similarity between documents and/or terms in the LSI space alluded to above.

A. Illustrative Example of the LSI Method

The contents of Table 1 are used to illustrate how the LSI technique works and to point out the differences between this method and conventional keyword matching.

TABLE 1

Document Set Based on Titles c1: Human machine interface for Lab ABC computer applications
c2: A survey of user opinion of computer system response time
c3: The EPS user interface management system
c4: Systems and human systems engineering testing of EPS-2
c5: Relation of user-perceived response time to error measurement
m1: The generation of random, binary, unordered trees
m2: The intersection graph of paths in trees
m3: Graph minors IV: Widths of trees and well-quasi-ordering
m4: Graph minors: A survey In this example, a file of text objects consists of nine titles of technical documents with titles c1-c5 concerned with human/computer interaction and titles m1-m4 concerned with mathematical graph theory. Using conventional keyword retrieval, if a user requested papers dealing with "human computer interaction," titles c1, c2, and c4 would be returned, since these titles contain at least one keyword from the user request. However, c3 and c5, while related to the query, would not be returned since they share no words in common with the request. It is now shown how LSI analysis treats this request to return titles c3 and c5.

Table 2 depicts the "term-by-document" matrix for the 9 technical document titles. Each cell entry, (i,j), is the frequency of occurrence of term i in document j. This basic term-by-document matrix or a mathematical transformation thereof is used as input to the statistical procedure described below.

TABLE 2

| TERMS | DOCUMENTS | | | | | | | | |
|---|---|---|---|---|---|---|---|---|---|
| | c1 | c2 | c3 | c4 | c5 | m1 | m2 | M3 | m4 |
| Human | 1 | 0 | 0 | 1 | 0 | 0 | 0 | 0 | 0 |
| interface | 1 | 0 | 1 | 0 | 0 | 0 | 0 | 0 | 0 |
| computer | 1 | 1 | 0 | 0 | 0 | 0 | 0 | 0 | 0 |

TABLE 2-continued

| TERMS | DOCUMENTS | | | | | | | | |
|---|---|---|---|---|---|---|---|---|---|
| | c1 | c2 | c3 | c4 | c5 | m1 | m2 | M3 | m4 |
| User | 0 | 1 | 1 | 0 | 1 | 0 | 0 | 0 | 0 |
| System | 0 | 1 | 1 | 2 | 0 | 0 | 0 | 0 | 0 |
| response | 0 | 1 | 0 | 0 | 1 | 0 | 0 | 0 | 0 |
| Time | 0 | 1 | 0 | 0 | 1 | 0 | 0 | 0 | 0 |
| EPS | 0 | 0 | 1 | 1 | 0 | 0 | 0 | 0 | 0 |
| Survey | 0 | 1 | 0 | 0 | 0 | 0 | 0 | 0 | 1 |
| Tree | 0 | 0 | 0 | 0 | 0 | 1 | 1 | 1 | 0 |
| Graph | 0 | 0 | 0 | 0 | 0 | 0 | 1 | 1 | 1 |
| Minor | 0 | 0 | 0 | 0 | 0 | 0 | 0 | 1 | 1 |

Figure 3:
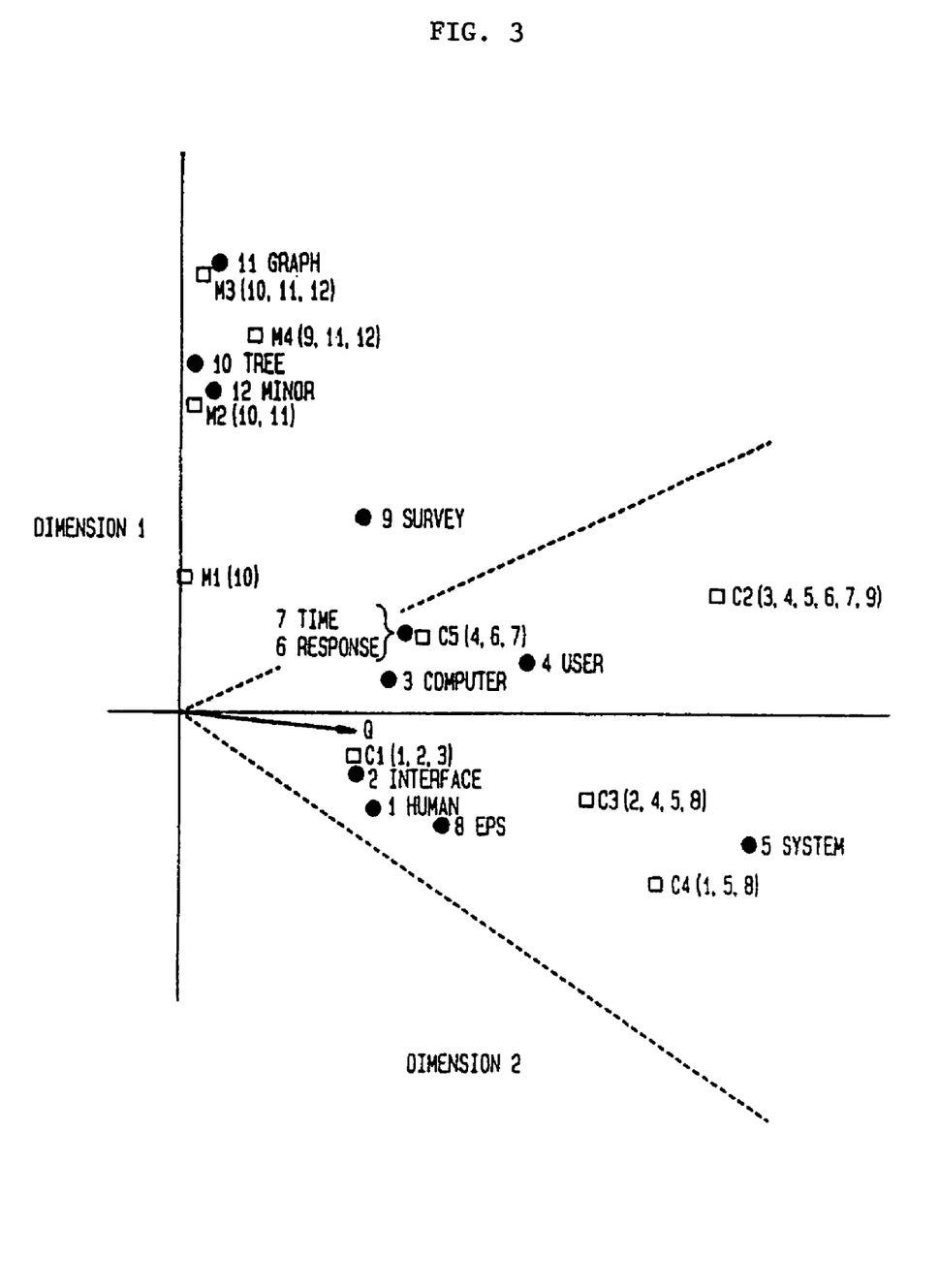
FIG. 3 is a plot of "term" coordinates and "document" coordinates based on a two-dimensional singular value decomposition of an original "term-by-document" matrix.

For this example the documents and terms have been carefully selected to yield a good approximation in just two dimensions for expository purposes. FIG. 3 is a two-dimensional graphical representation of the two largest dimensions resulting from the mathematical process of a singular value decomposition. Both document titles and the terms used in them are placed into the same representation space. Terms are shown as circles and labeled by number. Document titles are represented by squares with the numbers of constituent terms indicated parenthetically. The angle between two object (term or document) vectors describes their computed similarity. In this representation, the two types of documents form two distinct groups: all the mathematical graph theory titles occupy the same region in space (basically along Dimension 1 of FIG. 3); whereas a quite distinct group is formed for human/computer interaction titles (essentially along Dimension 2 of FIG. 3).

To respond to a user query about "human computer interaction," the query is first folded into this two-dimensional space using those query terms that occur in the space (namely, "human" and "computer"). ("Folding-in" is described below.) The query vector is located in the direction of the weighted average of these constituent terms, and is denoted by a directional arrow labeled "Q" in FIG. 3. A measure of closeness or similarity is the angle between the query vector and any given term or document vector. In FIG. 3 the cosine between the query vector and each c1-c5 titles is greater than 0.90; the angle corresponding to the cosine value of 0.90 with the query is shown by the dashed lines in FIG. 3. With this technique, documents c3 and c5 would be returned as matches to the user query, even though they share no common terms with the query. This is because the latent semantic structure (represented in FIG. 3) fits the overall pattern of term usage across documents.

B. Description of Singular Value Decomposition

To obtain the data to plot FIG. 3, the "term-by-document" matrix of Table 2 is decomposed using singular value decomposition (SVD). A reduced SVD is employed to approximate the original matrix in terms of a much smaller number of orthogonal dimensions. The reduced dimensional matrices are used for retrieval; these describe major associational structures in the term-document matrix but ignore small variations in word usage. The number of dimensions to represent adequately a particular domain is largely an empirical matter. If the number of dimensions is too large, random noise or variations in word usage will be modeled. If the number of dimensions is too small, significant semantic content will remain uncaptured. For diverse information sources, 100 or more dimensions may be needed.

To illustrate the decomposition technique, the term-by-document matrix, denoted Y, is decomposed into three other matrices, namely, the term matrix (TERM), the document matrix (DOCUMENT), and a diagonal matrix of singular values (DIAGONAL), as follows:

$$Y_{t,d} = TERM_{t,k} DIAGONAL_{k,k} DOCUMENT_{k,d}^T$$

where Y is the original t-by-d matrix, TERM is the t-by-k matrix that has unit-length orthogonal columns, DOCUMENT$^T$ is the transpose of the d-by-k DOCUMENT matrix with unit-length orthogonal columns, and DIAGONAL is the k-by-k diagonal matrix of singular values typically ordered by magnitude, largest to smallest.

The dimensionality of the solution, denoted k, is the rank of the t-by-d matrix, that is, $k \leq \min(t, d)$. Table 3, Table 4, and Table 5 below show the TERM and DOCUMENT matrices and the diagonal elements of the DIAGONAL matrix, respectively, as found via SVD.

TABLE 3

TERM MATRIX (12 terms by 9 dimensions)

| | | | | | | | | | |
|---|---|---|---|---|---|---|---|---|---|
| Human | 0.22 | −0.11 | 0.29 | −0.41 | −0.11 | −0.34 | −.52 | −0.06 | −0.41 |
| Interface | 0.20 | −0.07 | 0.14 | −0.55 | 0.28 | 0.50 | −0.07 | −0.01 | −0.11 |
| computer | 0.24 | 0.04 | −0.16 | −0.59 | −0.11 | −0.25 | −0.30 | 0.06 | 0.49 |
| User | 0.40 | 0.06 | −0.34 | 0.10 | 0.33 | 0.38 | 0.00 | 0.00 | 0.01 |
| System | 0.64 | −0.17 | 0.36 | 0.33 | −0.16 | −0.21 | −0.16 | 0.03 | 0.27 |
| Response | 0.26 | 0.11 | −0.42 | 0.07 | 0.08 | −0.17 | 0.28 | −0.02 | −0.05 |
| Time | 0.26 | 0.11 | −0.42 | 0.07 | 0.08 | −0.17 | 0.28 | −0.02 | −0.05 |
| EPS | 0.30 | −0.14 | 0.33 | 0.19 | 0.11 | 0.27 | 0.03 | −0.02 | −0.16 |
| Survey | 0.20 | 0.27 | −0.18 | −0.03 | −0.54 | 0.08 | −0.47 | −0.04 | −0.58 |
| Tree | 0.01 | 0.49 | 0.23 | 0.02 | 0.59 | −0.39 | −0.29 | 0.25 | −0.22 |
| Graph | 0.04 | 0.62 | 0.22 | 0.00 | −0.07 | 0.11 | 0.16 | −0.68 | 0.23 |
| Minor | 0.03 | 0.45 | 0.14 | −0.01 | −0.30 | 0.28 | 0.34 | 0.68 | 0.18 |

TABLE 4

DOCUMENT MATRIX (9 documents by 9 dimensions)

| | | | | | | | | | |
|---|---|---|---|---|---|---|---|---|---|
| c1 | 0.20 | −0.06 | 0.11 | −0.95 | 0.04 | −0.08 | 0.18 | −0.01 | −0.06 |
| c2 | 0.60 | 0.16 | −0.50 | −0.03 | −0.21 | −0.02 | −0.43 | 0.05 | 0.24 |
| c3 | 0.46 | −0.13 | 0.21 | 0.04 | 0.38 | 0.07 | −0.24 | 0.01 | 0.02 |
| c4 | 0.54 | −0.23 | 0.57 | 0.27 | −0.20 | −0.04 | 0.26 | −0.02 | −0.08 |
| c5 | 0.28 | 0.11 | −0.50 | 0.15 | 0.33 | 0.03 | 0.67 | −0.06 | −0.26 |
| m1 | 0.00 | 0.19 | 0.10 | 0.02 | 0.39 | −0.30 | −0.34 | 0.45 | −0.62 |
| m2 | 0.01 | 0.44 | 0.19 | 0.02 | 0.35 | −0.21 | −0.15 | −0.76 | 0.02 |
| m3 | 0.02 | 0.62 | 0.25 | 0.01 | 0.15 | 0.00 | 0.25 | 0.45 | 0.52 |
| m4 | 0.08 | 0.53 | 0.08 | −0.02 | −0.60 | 0.36 | 0.04 | −0.07 | −0.45 |

TABLE 5

DIAGONAL (9 singular values)

| | | | | | | | | |
|---|---|---|---|---|---|---|---|---|
| 3.34 | 2.54 | 2.35 | 1.64 | 1.50 | 1.31 | 0.84 | 0.56 | 0.36 |

As alluded to earlier, data to plot FIG. 3 was obtained by presuming that two dimensions are sufficient to capture the major associational structure of the t-by-d matrix, that is, k is set to two in the expression for $Y_{t,d}$, yielding an approximation of the original matrix. Only the first two columns of the TERM and DOCUMENT matrices are considered with the remaining columns being ignored. Thus, the term data point corresponding to "human" in FIG. 3 is plotted with coordinates (0.22,-0.11), which are extracted from the first row and the two left-most columns of the TERM matrix. Similarly, the document data point corresponding to title m1 has coordinates (0.00,0.19), coming from row six and the two left-most columns of the DOCUMENT matrix. Finally, the Q vector is located from the weighted average of the terms "human" and "computer" appearing in the query.

C. General Model Details

It is now elucidating to describe in somewhat more detail the mathematical model underlying the latent structure, singular value decomposition technique.

Any rectangular matrix Y of t rows and d columns, for example, a t-by-d matrix of terms and documents, can be decomposed into a product of three other matrices:

$$Y_0 = T_0 S_0 D_0^T \qquad (1)$$

such that $T_0$ and $D_0$ have unit-length orthogonal columns (i.e. $T_0^T T_0 = I$; $D_0^T D_0 = I$) and $S_0$ is diagonal. This is called the singular value decomposition (SVD) of Y. A procedure for SVD is described in the text "Numerical Recipes," by Press, Flannery, Teukolsky and Vetterling, 1986, Cambridge University Press, Cambridge, England, the entirety of which is incorporated by reference herein. $T_0$ and $D_0$ are the matrices of left and right singular vectors and $S_0$ is the diagonal matrix of singular values. By convention, the diagonal elements of $S_0$ are ordered in decreasing magnitude.

With SVD, it is possible to devise a simple strategy for an optimal approximation to Y using smaller matrices. The k largest singular values and their associated columns in $T_0$ and $D_0$ may be kept and the remaining entries set to zero. The product of the resulting matrices is a matrix $Y_R$ which is approximately equal to Y, and is of rank k. The new matrix $Y_R$ is the matrix of rank k which is the closest in the least squares sense to Y. Since zeros were introduced into $S_0$, the representation of $S_0$ can be simplified by deleting the rows and columns having these zeros to obtain a new diagonal matrix S, and then deleting the corresponding columns of $T_0$ and $D_0$ to define new matrices T and D, respectively. The result is a reduced model such that $$Y_R = TSD^T. \qquad (2)$$

The value of k is chosen for each application; it is generally such that $k \geq 100$ for collections of 1000-3000 data objects.

D. Example Similarity Comparisons

For discussion purposes, it is useful to interpret the SVD geometrically. The rows of the reduced matrices T and D may be taken as vectors representing the terms and documents, respectively, in a k-dimensional space. These vectors then enable the mathematical comparisons between the terms or documents represented in this space. Typical comparisons between two entities involve a dot product, cosine or other comparison between points or vectors in the space or as scaled by a function of the singular values of S. For example, if $d_1$ and $d_2$ respectively represent vectors of documents in the D matrix, then the similarity between the two vectors (and, consequently, the similarity between the two documents) can be computed as any of: (i) $d_1 \cdot d_2$, a simple dot product; (ii) $(d_1 \cdot d_2)/(\|d_1\| \times \|d_2\|)$, a simple cosine; (iii) $(d_1 S) \cdot (d_2 S)$, a scaled dot product; and (iv) $(d_1 S \cdot d_2 S)/(\|d_1 S\| \times \|d_2 S\|)$, a scaled cosine.

Mathematically, the similarity between representation $d_1$ and $d_2$ can be represented as $\langle d_1 | d_2 \rangle$. Then, for example, if the simple cosine from item (ii) above is used to compute the similarity between two vectors, $\langle d_1 | d_2 \rangle$ can be represented in the following well-known manner:

$$\langle d_1 | d_2 \rangle = \frac{d_1 \cdot d_2}{\|d_1\| \|d_2\|} = \frac{1}{\|d_1\| \|d_2\|} \left[ \sum_{i=1}^{k} d_{1,i} \cdot d_{2,i} \right], \quad (3)$$

where $d_{1,i}$ and $d_{2,i}$ are the components of the representations $d_1$ and $d_2$, respectively.

IV. Perturbing Latent Semantic Indexing Spaces

As mentioned above, an LSI space may be perturbed in different ways in accordance with embodiments of the present invention, including folding-in a document or a term, deleting a document or a term, and merging two or more LSI spaces. This section presents mathematical details for folding a document or a term in an LSI space, deleting a document or a term from an LSI space, and for merging two LSI spaces into a new LSI space. Before presenting these details, however, it is important to make clear the difference between creating an LSI space and perturbing an LSI space.

In the previous section, a technique for creating an LSI space was presented. Broadly speaking, this technique includes generating a term-by-document (T×D) matrix and reducing the dimensionality of the T×D matrix using SVD. While important to reduce the dimensionality of the T×D matrix, the SVD technique is computationally expensive and time consuming. Therefore, it may be impracticable or inefficient to recreate a new LSI space, and perform the SVD technique, to incorporate the influence of a new document and/or a new term.

By perturbing an LSI space in accordance with an embodiment of the present invention, the influence of a new document and/or a new term can be included in an LSI space without the need to perform the computationally expensive and time consuming SVD. The mathematical structure of the existing LSI space is used to represent a document and/or a term in the LSI space. Using this mathematical structure a document or term can be folded-in, a document or term can be removed, and/or the LSI space can be merged with a second LSI space.

A. Folding in Documents

The process of representing a document in an LSI space is often referred to as "folding" the document into the LSI space. The mathematical details for this process are the same whether the document is an existing document in the LSI space or a new document that is to be represented in the LSI space.

One criterion for such a derivation is that the insertion of a real document $Y_i$ should give $D_i$ when the model is ideal (i.e., $Y=Y_R$). With this constraint, $$Y_q = TSD_q^T \quad (4)$$

Multiplying both sides of equation (4) by the matrix $T^T$ on the left, and noting that $T^T T$ equals the identity matrix, yields, $$T^T Y_q = SD_q^T.$$

Multiplying both sides of this equation by $S^{-1}$ and rearranging yields the following mathematical expression for folding in a document:

$$D_q = Y_q^T T S^{-1}. \quad (5)$$

Thus, with appropriate rescaling of the axes, perturbing an LSI space to fold a document into the LSI space amounts to placing the vector representation of that document at the scaled vector sum of its corresponding term points.

As a prerequisite to folding a document into an LSI space, at least one or more of the terms in that document must already exist in the term space of the LSI space. The location of a new document that is folded into an LSI space ("the folded location") will not necessarily be the same as the location of that document had it been used in the creation of the LSI space ("the ideal location"). However, the greater the overlap between the set of terms contained in that document and the set of terms included in the term space of the LSI space, the more closely the folded location of the document will approximate the ideal location of the document.

B. Folding in Terms

Perturbing an LSI space can include representing a new term and/or an existing term in the LSI space without performing the computationally expensive SVD. Similar to documents, the process of representing a term in an LSI space is often referred to as "folding" the term into the LSI space. The mathematical details for this process are the same whether the term is an existing term in the LSI space or a new term that is to be represented in the LSI space.

Folding a term into the LSI space is similar to folding a document into the LSI space. The basic criterion is that the insertion of a real term into $Y_i$ should give $T_i$ when the model is ideal (i.e., $Y=Y_R$). With this constraint, $$Y_q = T_q SD^T. \quad (6)$$

Multiplying both sides of equation (6) by the matrix D, and noting that $D^T D$ equals the identity matrix, yields $$Y_q D = T_q S. \quad (7)$$

Multiplying both sides of equation (7) by $S^{-1}$ and rearranging yields the following mathematical expression for folding in a term:

$$T_q = Y_q DS^{-1}. \quad (8)$$

Thus, with appropriate rescaling of the axes, perturbing an LSI space to fold a term into the LSI space amounts to placing the vector representation of that term at the scaled vector sum of its corresponding document points.

As a prerequisite to folding a term into an LSI space, at least one or more of the documents using that term must already exist in the document space of the LSI space. Similar to documents, the location of a new term that is folded into an LSI space ("the folded location") will not necessarily be the same as the location of that term had it been used in the creation of the LSI space ("the ideal location"). However, the greater the number of documents in the LSI space that use that term, the more closely the folded location of the term will approximate the ideal location of the term.

C. Removing Documents or Terms

Documents and terms can each be removed from the LSI space without re-computing the computationally expensive SVD. Removing a document or term does not alter the representation of the other documents and terms in the LSI space. To remove a document, the row in the document matrix D corresponding to that document can be dropped. To drop the row, the row can simply be removed from the D matrix or all entries in that row can be set to zero. Similarly, to remove a term, the row in the term matrix T corresponding to that term can be dropped. Again, the row can simply be removed from the T matrix or all entries in that row can be set to zero.

D. Merging LSI Spaces

Perturbing an LSI space in accordance with an embodiment of the present invention may include merging two or more LSI spaces into a new LSI space. Merging the two or more LSI spaces may involve merging the term spaces, the document spaces, both the term spaces and documents spaces, or some other variation as would be apparent to a person skilled in the relevant art(s) from reading the description contained herein. The examples present below illustrate techniques for merging the term spaces of two or more LSI spaces. Techniques for merging the document spaces of two or more LSI spaces will be apparent from this description.

Using the notation presented above, a first LSI space may be mathematically represented as $$Y_1 = T_1 S_1 D_1^T. \quad (9)$$

Similarly, a second LSI space may be mathematically represented as $$Y_2 = T_2 S_2 D_2^T. \quad (10)$$

To merge the term spaces of these two LSI spaces, the term space of the first LSI space is merged with the term space of the second LSI space on a term-by-term basis. The concept of merging a single term in the first LSI space with a single term in the second LSI space will be illustrated with an example. Term-by-term merging of the first and second LSI spaces will be apparent from this example.

Suppose that the term space of the first LSI space and the term space of the second LSI space each contain the term "human." Then, a row of the $T_1$ matrix (from equation (9)) will correspond to the vector representation of the term "human" in the first LSI space. Mathematically, the vector representation for the term "human" in the first LSI space can be represented as $$h_1 = (a_1, a_2, \ldots, a_k), \quad (11)$$

where k is the dimensionality of the singular value matrix and the $a_i$ are the values in the row of the term matrix of the first LSI space corresponding with the term "human."

Similarly, a row of the $T_2$ matrix (from equation (10)) will correspond to the vector representation of the term "human" in the second LSI space. Mathematically, the vector representation for the term "human" in the second LSI space can be represented as $$h_2 = (b_1, b_2, \ldots, b_k), \quad (12)$$

similar to equation (11), where k is the dimensionality of the singular value matrix and the $b_i$ are the values in the row of the term matrix of the second LSI space corresponding with the term "human."

To merge the two LSI spaces, the vector representation $h_1$ must be "combined" with the vector representation $h_2$ to produce a new vector representation h'. As an example, combining the vectors may comprise averaging the two vectors, i.e., $$h'\left(\frac{a_1+b_1}{2}, \frac{a_2+b_2}{2}, \ldots, \frac{a_k+b_k}{2}\right). \quad (13)$$

However, other combining techniques may be used. For example, combining may include, but is not limited to, vector addition, vectorially averaging, or some other combining technique as would be apparent to a person skilled in the relevant art(s).

V. Examples of Perturbing LSI Spaces

Using techniques described above, there are several different sequences of perturbations that can be implemented to achieve various results. In this section, examples are presented in which documents/terms are added to and/or removed from an LSI space without the need for computing the computationally expensive SVD. It is to be appreciated that the examples presented below are for illustrative purposes only, and not limitation.

In a first example, a small sensitive collection of documents perturbs an existing LSI space built using public documents. This perturbation can be implemented, for example, through the following sequence of operations: (1) unfold or remove all public documents (similar to step 257 of FIG. 2); (2) fold in all documents of a combined collection of the public documents and sensitive documents (similar to step 253 of FIG. 2); (3) unfold all terms (similar to step 258 of FIG. 2); (4) fold in all terms of the combined collection of the public documents and sensitive documents (similar to step 256 of FIG. 2); (5) unfold all documents (similar to step 257 of FIG. 2); (6) fold in the original public documents (similar to step 252 of FIG. 2); and (7) unfold any overly sensitive terms as may be desired (similar to step 258 of FIG. 2). In this example, the successive folding of the collection of original documents augmented by a few other documents causes small perturbations in the LSI space that incorporate the influence of these other documents.

In a second example, multiple sources of sensitive documents are merged into a single LSI space without directly exposing the contents of the sensitive documents. To implement this example, the following sequence of operations can be used: (1) begin with multiple perturbed spaces as the prior example, each perturbed space initially based upon a common collection of documents; (2) merge the multiple perturbed spaces using a merging technique, such as term vector averaging (similar to step 259 of FIG. 2) to create only merged term data; and (3) fold in the original public documents (similar to step 252 of FIG. 2) to create a new space representing the merged influence of multiple sources of sensitive data, with no sharing or direct exposure of the sensitive content between the parties.

In a third example, a large change to an existing LSI space is achieved. To implement this example, the following sequence of operations may be used: (1) unfold all original documents (similar to step 257 of FIG. 2); (2) fold in a new large collection of documents that may or may not contain some or all of the original collection of documents (similar to step 253 of FIG. 2); and (3) fold in all terms or only the new terms of this new large collection of documents (similar to step 254 of FIG. 2). This example technique will insert many new terms in the space and optionally perturb the locations of the existing terms effectively adding the influence of the new documents to the existing document collection.

In a fourth example, the vector position of a subset of documents can be updated after another subset of documents in the LSI space has been removed. This idea will be illustrated with an example. Assume a collection of documents, C1, is used to create an LSI space as described above. Assume further that C1 comprises two subsets of documents, C2 and C3, such that C1=C2+C3. Simply removing the subset of documents C3 will not change the vector position of documents in subset C2. However, the vector position of each document in subset C2 can be updated after subset C3 is removed by implementing the following sequence of operations: (1) delete the documents of C3 (similar to step 257 of FIG. 2); (2) delete all terms (similar to step 258 of FIG. 2); (3) fold in the terms of the documents of C2 (similar to step 255 of FIG. 2); and (4) fold in the documents of C2 (similar to step 252 of FIG. 2).

Step (3) adds in the terms of the C2 documents, but since the document collection used is different from when the LSI space was created with C1, the terms will be placed in slightly different locations than they were previously (i.e., their positions will have been perturbed). Step (4) updates (perturbs) the positions of the documents of C2 using the slightly altered positions of the terms.

As mentioned above, these examples are presented for illustrative purposes only, and not limitation. Each of these examples, and other examples not specifically mentioned but contemplated within the scope and spirit of embodiments of the present invention, can be implemented on a computer system as described, for example, in the next section.

VI. Example Computer System Implementation

Figure 4:
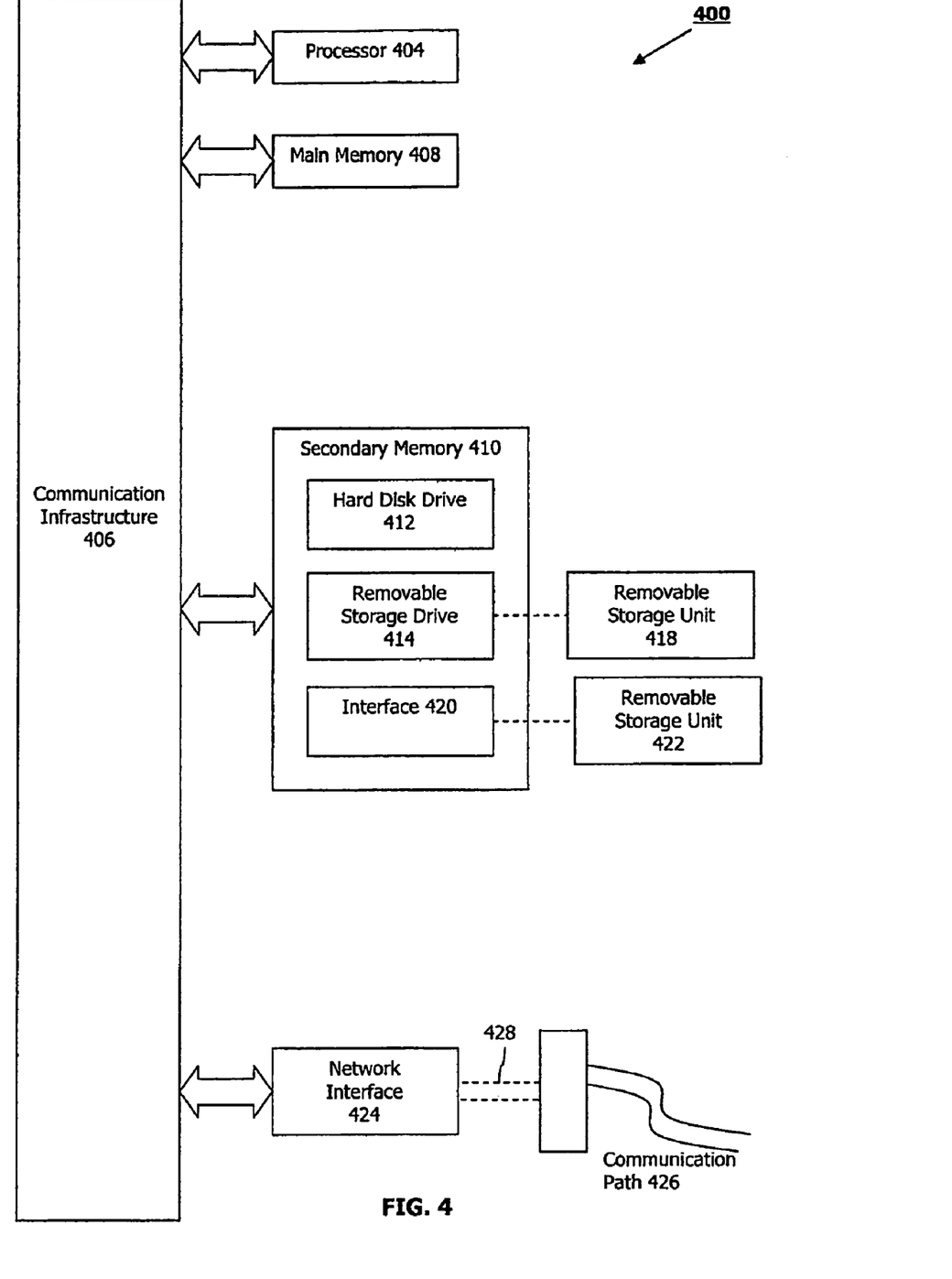
FIG. 4 is a block diagram of an exemplary computer system that may be used to implement an embodiment of the present invention.

Several aspects of the present invention can be implemented by software, firmware, hardware, or a combination thereof. FIG. 4 illustrates an example computer system 400 in which an embodiment of the present invention, or portions thereof, can be implemented as computer-readable code. For example, the methods illustrated by the flowchart of FIG. 1 and the flowchart of FIG. 2 can be implemented in system 400. Various embodiments of the invention are described in terms of this example computer system 400. After reading this description, it will become apparent to a person skilled in the relevant art how to implement the invention using other computer systems and/or computer architectures and/or combinations of other computer systems.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412 and/or a removable storage drive 414. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals 428 which may be electronic, electromagnetic, optical, or other signals capable of being received by communications interface 424. These signals 428 are provided to communications interface 424 via a communications path 426. Communications path 426 carries signals 428 and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, a hard disk installed in hard disk drive 412, and signals 428. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement embodiments of the present invention as discussed herein. In particular, the computer programs, when executed, enable processor 404 to implement processes of the present invention, such as steps in the methods illustrated by the flowchart of FIG. 1 and the flowchart of FIG. 2 discussed above. Accordingly, such computer programs represent controllers of the computer system 400. Where embodiments of the present invention are implemented using software, the software may be stored in a computer program product and loaded into computer system 400 using removable storage drive 414, interface 420, hard drive 412 or communications interface 424.

Embodiments of the present invention are also directed to computer products comprising software stored on any computer useable medium. Such software, when executed in one or more data processing device, causes a data processing device(s) to operate as described herein. Embodiments of the present invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VII. Example Capabilities and Applications

Embodiments of the present invention described herein have many capabilities and applications. The following example capabilities and applications are described below: sensitive data capabilities; categorization/monitoring capabilities; and applications in specific industries or technologies. These examples are presented by way of illustration, and not limitation. Other capabilities and applications, as would be apparent to a person having ordinary skill in the relevant art(s) from the description contained herein, are contemplated within the scope and spirit of the present invention.

SENSITIVE DATA CAPABILITIES. Embodiments of the present invention may be used to share the influence of sensitive information without sharing the content of the sensitive information. An example will illustrate this point.

The intelligence community may have sensitive information that it does not want to make public. However, they may want to enable others to search publicly available information in a manner reflecting the influence of the sensitive information. Using an embodiment of the present invention, this sensitive information can be included in an abstract mathematical vector space without exposing the content of the sensitive information. First, an abstract mathematical vector space can be generated from a collection of public documents, wherein each term and document in the collection of public documents has a representation in the abstract mathematical space. Second, the sensitive documents can be folded in. Third, the representations of all terms in the space can be deleted. Fourth, all terms of the combined public and sensitive documents can be folded in to create term representations perturbed by the sensitive documents. Fifth, the representations of all the documents can be deleted from the abstract mathematical space. Then, all public documents can be folded into the abstract mathematical space. And, finally, any terms deemed to be overly sensitive can be deleted. In this way, the representation of each public document will be modified by the inclusion of the sensitive terms. As a result, the sensitive information can be used to influence the representation of each public document without exposing the content of the sensitive information.

CATEGORIZATION AND MONITORING CAPABILITIES. Embodiments of the present invention may be used in conjunction with a categorization scheme that is periodically updated based on new items and/or information. A categorization scheme may be based on an abstract mathematical vector space that represents documents or information as vectors. The abstract mathematical vector space can be an LSI space. For example, such a categorization scheme is described in commonly-owned U.S. patent application Ser. No. 11/262,735, entitled "Generating Representative Exemplars For Indexing, Clustering, Categorization, and Taxonomy," the entirety of which is incorporated by reference herein. Using monitoring techniques, new information can be included in the categorization scheme. However, recomputing the abstract mathematical vector space each time new information becomes available would be computationally expensive and time consuming. Using embodiments of the present invention, the abstract mathematical vector space could be perturbed on a relatively short time scale (such as a daily basis) to include the influence of newly obtained information; and the entire abstract mathematical vector space could be recomputed on a relatively long time scale (such as a monthly basis) to fully incorporate newly obtained information. In this way, the categorization scheme can remain current, while at the same time minimizing the need to re-compute the abstract mathematical vector space each time new information is received.

For example, the above-mentioned categorization schemes can be used for employee recruitment. Such a categorization scheme may be used to match resumes to job descriptions. As new resumes are received and/or as new jobs are listed, the abstract mathematical vector space underlying the categorization scheme can be perturbed to include the influence of these new resumes and job listings.

The types of media outlets that can be monitored can include, but are not limited to, email, chat rooms, blogs, web-feeds, websites, magazines, newspapers, and other forms of media in which information is displayed, printed, published, posted and/or periodically updated.

APPLICATIONS IN INDUSTRY. Embodiments of perturbing an abstract mathematical vector space (such as an LSI space) as described herein can be used in several different industries. For example, embodiments of the present invention may be used in valuation determinations that are made during the negotiation of a corporate merger. During negotiations of a potential merger, both sides must provide information to make the deal go forward; however, neither side wants to divulge sensitive information because they each want to protect against risks that may materialize if the deal fails.

For example, suppose Company A and Company B are considering a potential merger. Suppose further that Company A has trade secrets that could potentially raise its value during merger negotiations with Company B, but Company A does not want to divulge these trade secrets before a deal is finalized. Using an embodiment of the present invention, Company A can share the influence of these trade secrets with Company B (to help the deal go forward), without exposing the content of the trade secrets (to protect against risks if a deal cannot be reached). To do this, an abstract mathematical vector space can be generated based on a collection of public documents that is representative of the industries in which Companies A and B operate. The abstract mathematical vector space can be perturbed using an embodiment of the present invention to create a perturbed abstract mathematical vector space that includes the influence of Company A's trade secrets. Then, Company B could query the perturbed abstract mathematical vector space to determine if the trade secrets would be valuable to Company B. In this way, the content of the trade secrets would not be disclosed, but Company B could determine the value of these trade secrets during the process of negotiations.

VIII. Conclusion

As mentioned above, embodiments of the present invention provide a method and computer program product for processing text. The specifications and the drawings used in the foregoing description were meant for exemplary purposes only, and not limitation. It is intended that the full scope and spirit of the present invention be determined by the claims that follow.

What is claimed is:

1. A computer-based text processing method, comprising:
  (a) generating, using a processor, an abstract mathematical vector space based on a collection of documents, wherein respective documents in the collection of documents have a representation in the abstract mathematical vector space and respective terms contained in the collection of documents have a representation in the abstract mathematical vector space; and
  (b) perturbing, using a processor, the abstract mathematical vector space to produce a perturbed abstract mathematical vector space that is stored in an electronic format accessible to a user, wherein perturbing the abstract mathematical vector space comprises at least one of (i) modifying the representation of a document with a newly computed representation for that document, and (ii) modifying the representation of a term with a newly computed representation for that term.

2. The computer-based method of claim 1, wherein generating an abstract mathematical vector space comprises generating a Latent Semantic Indexing (LSI) space.

3. The computer-based method of claim 1, wherein prior to the perturbing step the method further comprises representing a document not included in the collection of documents in the abstract mathematical vector space.

4. The computer-based method of claim 1, wherein prior to the perturbing step the method further comprises representing a term not contained in the collection of documents in the abstract mathematical vector space.

5. The computer-based method of claim 1, wherein perturbing the abstract mathematical vector space further comprises representing an additional document in the perturbed abstract mathematical vector space.

6. The computer-based method of claim 1, wherein perturbing the abstract mathematical vector space further comprises representing an additional term in the perturbed abstract mathematical vector space.

7. The computer-based method of claim 1, wherein perturbing the abstract mathematical vector space further comprises deleting from the perturbed abstract mathematical vector space document data relating to a document.

8. The computer-based method of claim 1, wherein perturbing the abstract mathematical vector space further comprises deleting from the perturbed abstract mathematical vector space term data relating to a term.

9. A computer-based text processing method, comprising:
(a) providing, using a processor, a first abstract mathematical vector space and a second abstract mathematical vector space, wherein each document of a first collection of documents is represented in the first abstract mathematical vector space and each document of a second collection of documents is represented in the second abstract mathematical vector space; and
(b) merging the first abstract mathematical vector space with the second abstract mathematical vector space to produce a merged abstract mathematical vector space that is stored in an electronic format accessible to a user, wherein the merging comprises at least one of (i) averaging a representation of a first document in the first abstract mathematical vector space with a representation of the first document in the second abstract mathematical vector space to generate a new representation of the first document in the merged abstract mathematical vector space, and (ii) averaging a representation of a first term included in the first abstract mathematical vector space with a representation of the first term in the second abstract mathematical vector space to generate a new representation of the first term in the merged abstract mathematical vector space.

10. The computer-based method of claim 9, wherein step (a) comprises:
generating a first abstract mathematical vector space based on a first collection of documents; and
generating a second abstract mathematical vector space based on a second collection of documents.

11. The computer-based method of claim 9, wherein step (a) comprises:
generating a first abstract mathematical vector space based on a first collection of documents; and
receiving a second abstract mathematical vector space that is based on a second collection of documents, wherein the second abstract mathematical vector space comprises a perturbed abstract mathematical vector space.

12. The computer-based method of claim 9, wherein step (a) comprises:
receiving a first abstract mathematical vector space that is based on a first collection of documents, wherein the first abstract mathematical vector space comprises a perturbed abstract mathematical vector space; and
receiving a second abstract mathematical vector space that is based on a second collection of documents, wherein the second abstract mathematical vector space comprises a perturbed abstract mathematical vector space.

13. A tangible computer program product comprising a computer readable storage medium having control logic stored therein for causing a computer to process text, the control logic comprising:
computer readable first program code that causes the computer to generate an abstract mathematical vector space based on a collection of documents, wherein respective documents in the collection of documents have a representation in the abstract mathematical vector space and respective terms contained in the collection of documents have a representation in the abstract mathematical vector space; and
computer readable second program code that causes the computer to perturb the abstract mathematical vector space to produce a perturbed abstract mathematical vector space that is stored in an electronic format accessible to a user, wherein perturbing the abstract mathematical vector space comprises at least one of (i) modifying the representation of a document with a newly computed representation for that document, and (ii) modifying the representation of a term with a newly computed representation for that term.

14. The computer program product of claim 13, wherein the abstract mathematical vector space comprises a Latent Semantic Indexing (LSI) space.

15. The computer program product of claim 13, wherein the computer readable second program code comprises code to cause the computer to represent a document not included in the collection of documents in the abstract mathematical vector space prior to perturbing the abstract mathematical vector space to produce the perturbed abstract mathematical vector space.

16. The computer program product of claim 13, wherein the computer readable second program code comprises code to cause the computer to represent a term not contained in the collection of documents in the abstract mathematical vector space prior to perturbing the abstract mathematical vector space to produce the perturbed abstract mathematical vector space.

17. The computer program product of claim 13, wherein the computer readable second program code further comprises code that causes the computer to represent an additional document in the perturbed abstract mathematical vector space.

18. The computer program product of claim 13, wherein the computer readable second program code further comprises code that causes the computer to represent an additional term in the perturbed abstract mathematical vector space.

19. The computer program product of claim 13, wherein the computer readable second program code further comprises code that causes the computer to delete from the perturbed abstract mathematical vector space document data relating to a document.

20. The computer program product of claim 13, wherein the computer readable second program code further comprises code that causes the computer to delete from the perturbed abstract mathematical vector space term data relating to a term.

21. A tangible computer program product comprising a computer readable storage medium having control logic stored therein for causing a computer to process text, the control logic comprising:
computer readable first program code that causes the computer to provide a first abstract mathematical vector space and a second abstract mathematical vector space, wherein the first abstract mathematical vector space is based on a first collection of documents and the second abstract mathematical vector space is based on a second collection of documents; and
computer readable second program code that causes the computer to merge the first abstract mathematical vector space with the second abstract mathematical vector space to produce a merged abstract mathematical vector space that is stored in an electronic format accessible to a user, wherein merging is based on a vector averaging of vectors in the first abstract mathematical vector space with vectors in the second abstract mathematical vector space.

22. The computer program product of claim 21, wherein the computer readable first program code comprises:
   code that causes the computer to generate a first abstract mathematical vector space based on a first collection of documents; and
   code that causes the computer to generate a second abstract mathematical vector space based on a second collection of documents.

23. The computer program product of claim 21, wherein the computer readable first program code comprises:
   code that causes the computer to generate a first abstract mathematical vector space based on a first collection of documents; and
   code that causes the computer to receive a second abstract mathematical vector space that is based on a second collection of documents, wherein the second abstract mathematical vector space comprises a perturbed abstract mathematical vector space.

24. The computer program product of claim 21, wherein the computer readable first program code comprises:
   code that causes the computer to receive a first abstract mathematical vector space that is based on a first collection of documents, wherein the first abstract mathematical vector space comprises a perturbed abstract mathematical vector space; and
   code that causes the computer to receive a second abstract mathematical vector space that is based on a second collection of documents, wherein the second abstract mathematical vector space comprises a perturbed abstract mathematical vector space.

25. The computer program product of claim 21, wherein the computer readable second program code comprises:
   code that causes the computer to merge the first abstract mathematical vector space with the second abstract mathematical vector space to produce a merged abstract mathematical vector space that is stored in an electronic format accessible to a user, wherein merging is based on at least one of (i) a vector averaging of document vectors in the first abstract mathematical vector space with document vectors in the second abstract mathematical vector space, and (ii) a vector averaging of term vectors in the first abstract mathematical vector space with term vectors in the second abstract mathematical vector space.

* * * * *